June 30, 1925.

H. L. LITCHFIELD ET AL 1,544,413

VEHICLE

Filed May 3, 1922

INVENTORS:
H. L. Litchfield,
E. C. Litchfield,
BY
ATTORNEY

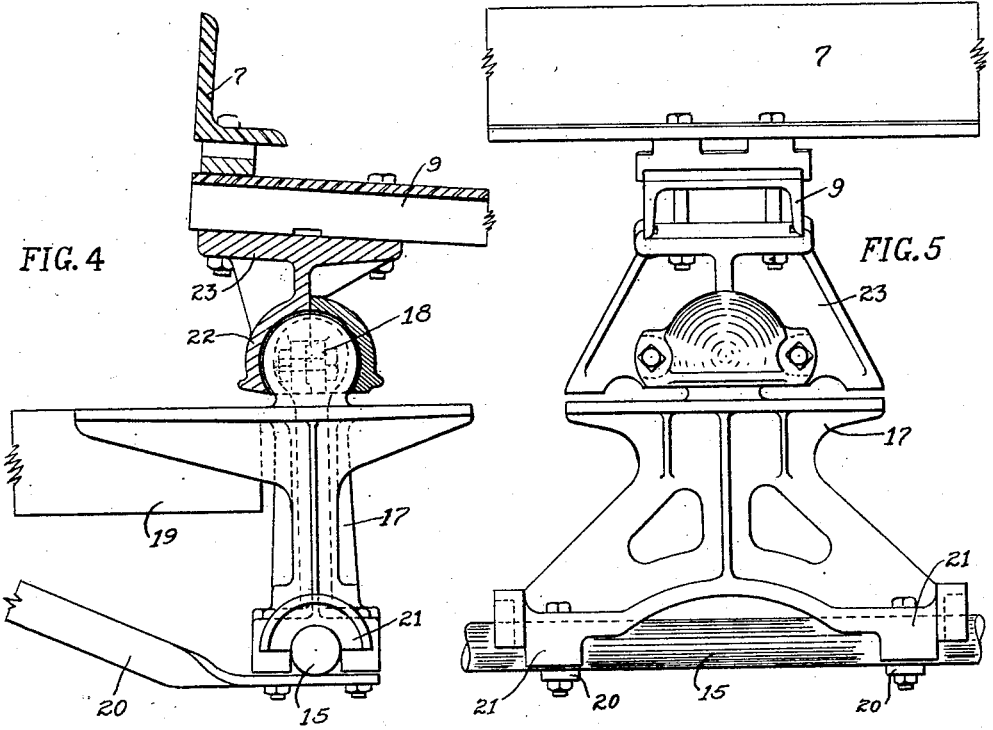
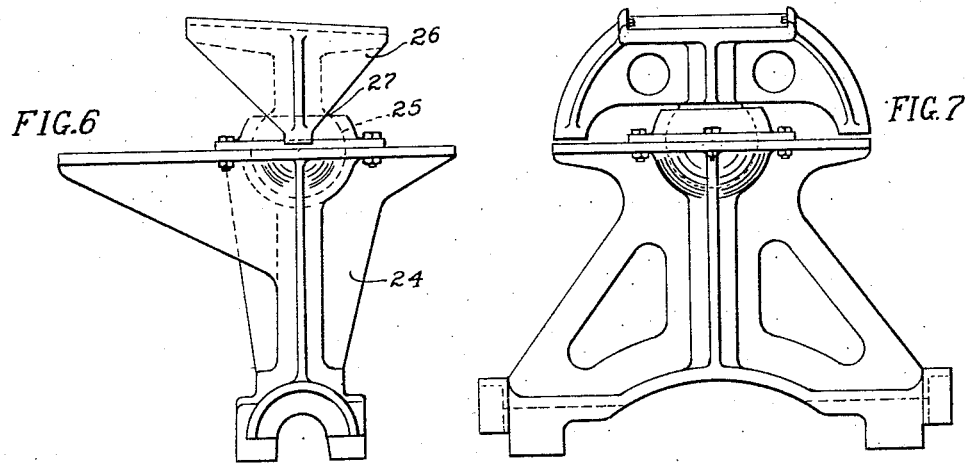

Patented June 30, 1925.

1,544,413

UNITED STATES PATENT OFFICE.

HENRY L. LITCHFIELD, EDGAR C. LITCHFIELD, VICTOR SPEER, AND CLARENCE C. HERMANN, OF WATERLOO, IOWA; SAID SPEER AND SAID HERMANN ASSIGNORS TO HENRY L. LITCHFIELD AND EDGAR C. LITCHFIELD, OF WATERLOO, IOWA.

VEHICLE.

Application filed May 3, 1922. Serial No. 558,131.

*To all whom it may concern:*

Be it known that we, HENRY L. LITCHFIELD, EDGAR C. LITCHFIELD, VICTOR SPEER, and CLARENCE C. HERMANN, citizens of the United States, residing at Waterloo, county of Blackhawk, State of Iowa, have invented a certain new and useful Improvement in Vehicles, and declare the following to be a full, clear, and exact description of the same, such as will enable others skilled in the art to which it pertains to make and use the same, reference being had to the accompanying drawings, which form a part of this specification.

The present invention relates to vehicle construction, particularly to vehicle bodies used in straw and manure spreaders. In spreaders of this kind the distributing mechanism is driven from the rear wheels so that the pulling stresses which must be transmitted between the draft gear at the front and the rear axle are so great as to necessitate the provision of special means for taking care of them. In the case of light spreaders it has been customary to employ a reach, while in the case of large spreaders heavy longitudinal sills have heretofore been employed.

One of the objects of the present invention is to produce a simple and novel vehicle construction in which, without the use of a reach or of heavy sills, sufficient mechanical strength and rigidity may be secured to withstand heavy pulling stresses. In carrying out this feature of the present invention the vehicle body is built on a foundation consisting of a strong framework made of a front section which transmits the load to the fifth wheel and other sections extending upwardly and to the rear, the strength and weight of the metal used in the various sections decreasing gradually from the front to the rear so that the load on the framework is distributed between a number of comparatively light elements and, as it is transmitted toward the fifth wheel, is carried through heavier elements until the load is concentrated at the fifth wheel in a comparatively heavy section of great rigidity and strength. In this way there is secured a maximum strength for a given weight of material and it is possible for a vehicle built up in this way to possess the ruggedness and strength of one of the old types of vehicles whose weight is perhaps fifty percent greater.

Another feature of the present invention has to do with a novel arrangement of the front supporting wheels of a spreader or other vehicle, whereby the overall length of the vehicle is shortened, and a much sharper turn may be made than is possible with the ordinary vehicle construction. To this end the front axle is made comparatively short, preferably of a length considerably less than the width of the vehicle body, and the wheels are made small; whereby the entire wheeled front axle may be placed underneath the spreader body.

A third feature of the present invention has to do with the fifth wheel of a vehicle, and has for its object to produce a simple, rugged and efficient construction.

The various features of novelty whereby the present invention is characterized will hereinafter be pointed out with particularity in the claims; but, for a full understanding of the present invention and of its objects and advantages, reference may be had to the following detailed description taken in connection with the accompanying drawings, wherein:

Fig. 4 is a view partly in side elevation and partly in longitudinal section, on an enlarged scale, illustrating the fifth wheel and the immediately adjacent portions of the vehicle body and draft member;

Fig. 5 is an elevation of the parts shown in Fig. 4, looking toward the left at the right hand end of Fig. 4; and Figs. 6 and 7 are respectively a side elevation and a front elevation of a modified form of fifth wheel construction.

Figure 1:
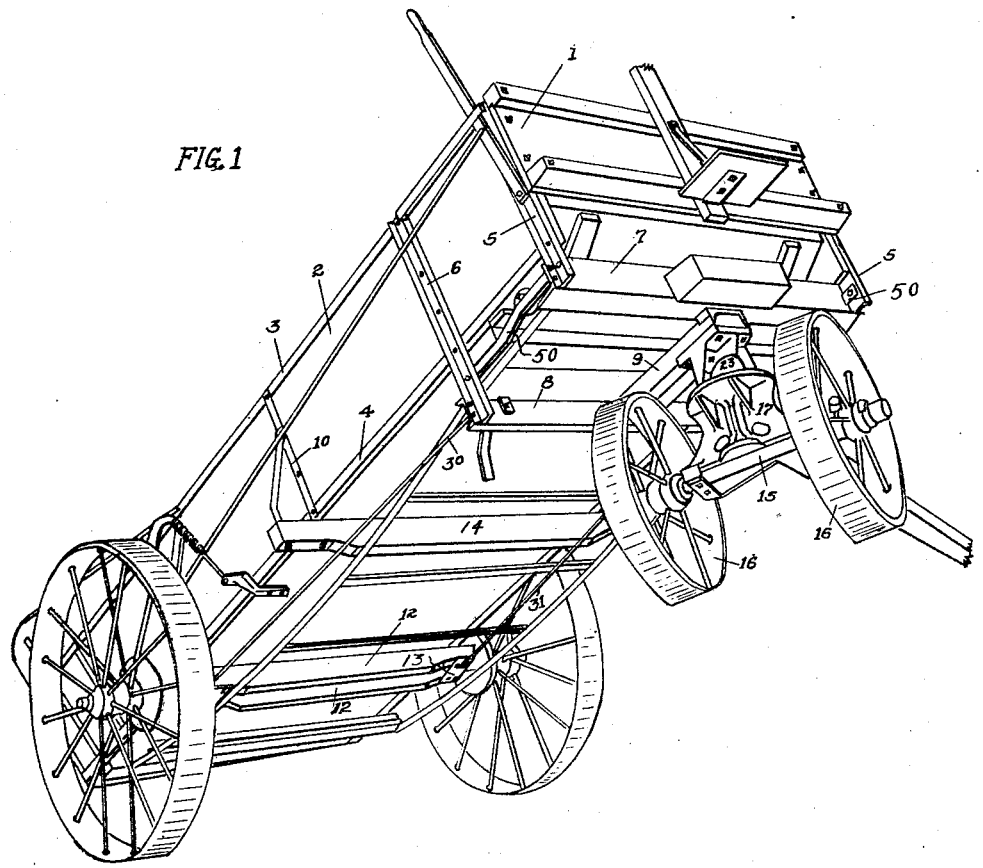
Figures 1, 2 and 3 are respectively a perspective view, a front elevation, and a side elevation of a spreader embodying the present invention.

Referring to Figs. 1 to 5 of the drawings 1 represents a wagon box having side walls 2. The end and side walls may take any usual or preferred forms, being conveniently made, however, of simple wooden panels. Along the upper and lower edges of each side panel are placed longitudinal binding pieces 3 and 4; these being preferably made of light structural steel, preferably steel angles. At the front end of the body, on each side thereof, are placed two metal uprights 5 and 6, the members 5 being conveniently placed approximately at the front corners of the body and the members 6 being placed somewhat farther back. The uprights are secured to the longitudinals 3 and 4 and are made of heavier material than the latter; being also preferably simple structural steel elements such as, for example, light channels. Below the front end of the body is a strong rigid metal frame or platform conveniently made of two comparatively heavy transverse metal beams 7 and 8; the ends of the member 7 being connected to the lower ends of the uprights 5 and the ends of the member 8 being connected to the lower ends of the uprights 6. The members 7 and 8 are also made of structural steel but of heavier section than the uprights. In the arrangement shown, the member 7 is in the form of an angle bar while the member 8 is in the form of a channel. The members 7 and 8 are rigidly fastened together, preferably by means of a single short heavy beam 9 extending longitudinally of the body from the middle of one of the beams to the middle of the other. In the arrangement shown, the member 9 is in the form of a channel. Where the spreader is of the endless-apron type illustrated, the beams 8 and 9 must lie below the beam 7 in order to provide clearance space above them for the lower run of the apron; the beam 9 preferably extending at its front end underneath the beam 7 and lying flush with the top of the beam at the rear end. The longitudinals 3 and 4 may be connected together at one or more points, if desired, by means of vertical bars or pieces 10.

The rear end of the body is adapted to be supported upon a suitable rear axle 11, in any suitable manner. In the arrangement shown, there are fastened underneath the rear end of the body two parallel transverse beams 12, 12, spaced apart from each other far enough to receive the axle between them and carrying the rear axle bearings of which the bottom plates 13 are shown. The metal longitudinals extend back at least to the rear axle and preferably to the rear end of the body, and they are preferably connected together at each side of the body by means of vertical connecting pieces each lying approximately above an end of one of the beams 12, 12. If desired, a cross beam, such as indicated at 14, may be placed under the body about midway between the front and rear points of support for the latter.

The lower ends of the front uprights 5 are connected to the corresponding uprights 6 by means of bars 50 riveted at their ends to the uprights. These bars serve primarily to support the front floor cleat 51 and the front conveyor shaft 52 of the spreader; but their location is such that they also serve greatly to strengthen and reinforce the metal framework.

It will be seen that if the draft on the vehicle is applied through the beam 9 to the front end of the body, it will be transmitted from this beam to the two lighter beams 7 and 8, from these latter beams to still lighter members 5 and 6 and from the members 5 and 6 through the still lighter longitudinals and the side panels to the rear axle. In other words, the concentrated pulling force is applied to a single heavy member and it is gradually distributed through members increasing in number and lightness until the rear axle is reached. By placing the light longitudinals along the edges of the side panels, the latter are made to serve as effective load-carrying members, thus permitting the longitudinals to be made extremely light as compared to the sills which would be required, if placed underneath the body extending from the front end to the rear axle. Consequently great strength is secured without employing an excessive weight of material.

It will also be seen that the entire metal framework may be made out of simple structural steel shapes which need simply be cut to length, punched and riveted or bolted together, no special forgings or castings being required. The cost of the framework will therefore be low.

Furthermore, by riveting the upright frame member to the longitudinals and simply bolting them to the heavy cross beams 7 and 8, the body may be taken apart for shipping purposes while the advantages of riveted construction, upon reassembling the parts, are retained.

The front end of the body is carried upon a short axle 15 provided with wheels 16 small enough in diameter to underlie the body; the length of the front axle being preferably considerably less than the width of the body. On the front axle rests a suitable pedestal 17 having at the top the ball member 18 of a ball and socket joint. A wagon tongue or drawbar 19 is fastened to the pedestal near the upper end of the latter, and bracing strips 20 extend from the tongue or drawbar diagonally downward in the rearward direction, the rear ends underlying the bottom of the pedestal and each forming the cap for one of the bearings 21 between the pedestal and the axle.

The socket member 22 of the ball and socket joint, of which the member 18 forms a part, is located in the bottom of a strong casting 23 underlying and bolted or otherwise fixed to the front end of the heavy beam 9. The lower end of the member 23 and the upper portion of the pedestal, just below the ball, are so designed that the front axle may turn completely around on a vertical axis and may rock a limited distance in other directions.

It will be seen that the pull exerted by the wagon tongue or drawbar is transmitted to the spreader or wagon at a point near the ball and socket joint and remote from the front axle, so that there is no tendency on the part of the tongue or drawbar to swing upward, under load, as would be the case if the connection between the same and the spreader or wagon were nearer the front axle.

In Figs. 6 and 7 there is shown a modified form of fifth wheel in which the pedestal 24, while otherwise the same as the pedestal 17, is provided with a socket 25 in the top thereof. The casting 26 which is adapted to be fixed to the metal framework of the wagon body is provided with a ball 27 at the lower end. In other words, the positions of the ball and socket members are simply reversed from those shown in Figs. 4 and 5.

In spreaders it is desirable that the body slope downwardly somewhat from the front to the rear so as to secure the assistance of gravity in feeding the contents toward the rear. This affords sufficient head room between the effective bottom of the body at the front end thereof and the ground to permit the employment of the strong bottom frame section heretofore described and of the rugged fifth wheel without making the front wheels of the spreader unduly small. It will be seen that by placing the front wheels back under the body there is obtained a short wheel base without sacrificing the capacity for making a sharp turn such as could otherwise be obtained only by placing the front wheels far in advance of the front end of the body.

Figure 2:
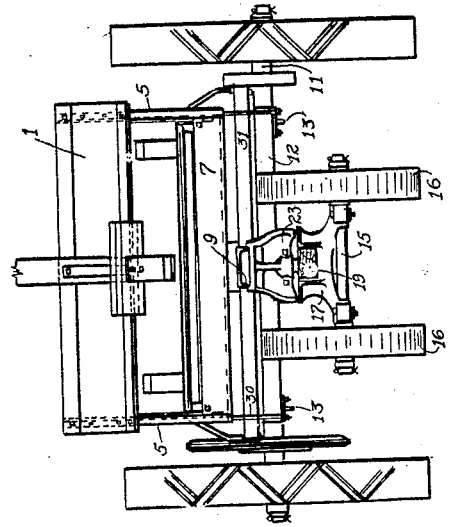
Figure 3:
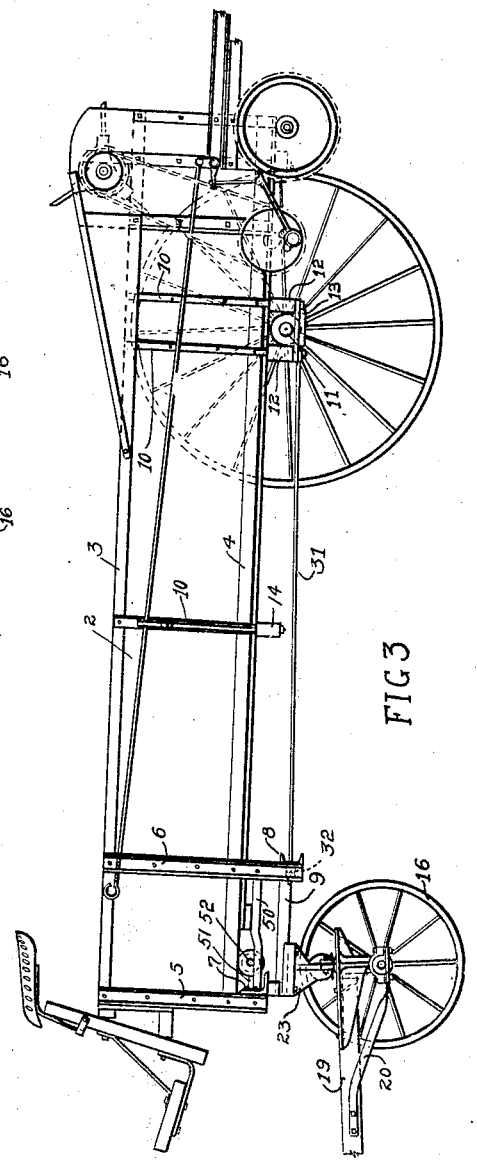

If it be desired, tie rods, such as indicated at 30 and 31 in Figs. 1, 2 and 3 may be placed between the ends of the heavy cross beam 8 and the bottom bearing plates 13 which underlie the cross beams 12 at the rear end of the spreader. These tie rods will serve to transmit a direct pull from the beam 8 to the rear axle, so that the comparatively light upper sections of the metal framework need not carry all the load. Adjustment of the effective lengths of these rods may be secured by means of nuts 32 screwed on the front ends thereof. By tightening these nuts from time to time any looseness or slack in the rods may be taken up.

While only a single embodiment of the present invention, with a slight modification, has been illustrated and described in detail, it is not intended that the invention shall be limited to the particular details thus illustrated and described; but it is intended to cover all forms and arrangements which fall within the terms of the definitions of the present invention constituting the appended claims.

We claim:

1. A vehicle body including side panels, a strong metal frame extending transversely of said side panels and underlying the front ends of the same, metal uprights connected to said frame and extending upwardly beside said panels, metal longitudinals extending along the upper and the lower edges of said panels and secured at their front ends to said uprights, and means at the middle of the front end of said frame for supporting the vehicle body on a front axle.

2. A vehicle body adapted to be supported at the front end on a fifth wheel and at the rear end on an axle, said body including side panels, a strong metal frame underlying the front ends of the side panels and adapted to transmit the load to the fifth wheel, metal uprights connected to the ends of said frame and extending upwardly beside said panels, and metal longitudinals connected at their front ends to said uprights and extending rearwardly along said panels at least to a point directly above the said axle, the rear portion of said frame lying a considerable distance below said panels so as to leave a clear space between the same and the lower edges of the panels.

3. A vehicle body including side panels, two separated comparatively heavy metal beams and underlying the front ends of said panel and extending transversely thereof, a short heavy beam extending between the aforesaid beams midway between the ends of the latter and rigidly connected to the same, a part at the front end of said short heavy beam for supporting the front end of the vehicle body upon a front axle, metal uprights connected to the ends of said transverse beams and extending upwardly beside said panels, metal longitudinals connected at their front ends to said uprights and extending rearwardly along the upper and lower edges of said panels.

4. In combination, a vehicle body, a pair of parallel transverse metal beams arranged beneath the front end of said body and spaced apart from each other in the direction of the length of said body, the rearmost beam lying far enough below the bottom of said body to provide a clear space between the same and said beam, metal uprights extending downwardly beside said body and secured at their lower ends to said beams, and light longitudinal metal members secured to said uprights and extending rearwardly along the sides of said body.

In testimony whereof, we sign this specification.

HENRY L. LITCHFIELD.
EDGAR C. LITCHFIELD.
VICTOR SPEER.
CLARENCE C. HERMANN.